United States Patent [19]

Schwarze

[11] Patent Number: 5,518,107
[45] Date of Patent: May 21, 1996

[54] STRIPPER ELEMENT MOUNTED ON A SYSTEM OF A STRIPPING DEVICE

[76] Inventor: Hans-Otto Schwarze, Esseler Strasse 170, 45665 Recklinghausen, Germany

[21] Appl. No.: 244,836

[22] PCT Filed: Oct. 8, 1993

[86] PCT No.: PCT/EP93/02764

§ 371 Date: Jun. 10, 1994

§ 102(e) Date: Jun. 10, 1994

[87] PCT Pub. No.: WO94/08877

PCT Pub. Date: Apr. 28, 1994

[30] Foreign Application Priority Data

Oct. 13, 1992 [DE] Germany .................. 9213788 U
Jun. 15, 1993 [DE] Germany .................. 9308826 U

[51] Int. Cl.⁶ .................................................. B65G 45/00
[52] U.S. Cl. ................................................. 198/499
[58] Field of Search ........................... 198/499, 497; 15/256.5, 256.51, 256.6

[56] References Cited

U.S. PATENT DOCUMENTS

| | | | |
|---|---|---|---|
| 4,359,150 | 11/1982 | Bowman et al. | 198/497 |
| 4,533,035 | 8/1985 | Reiter | 198/499 |
| 4,535,883 | 8/1985 | Kerr | 198/499 |
| 4,633,999 | 1/1987 | Perneczky | 198/499 |
| 4,696,389 | 9/1987 | Schwarze | 198/499 |
| 4,768,644 | 9/1988 | Cromm | 198/499 |
| 4,850,474 | 7/1989 | Schwarze | 198/499 |
| 5,011,002 | 4/1991 | Gibbs | 198/499 X |
| 5,016,746 | 5/1991 | Gibbs | 198/499 |
| 5,082,106 | 1/1992 | Schwarze | 198/499 |

FOREIGN PATENT DOCUMENTS

| | | | |
|---|---|---|---|
| 0251051 | 1/1988 | European Pat. Off. | 198/499 |
| 3742583 | 5/1989 | Germany | 198/499 |

*Primary Examiner*—D. Glenn Dayoan
*Attorney, Agent, or Firm*—Webb Ziesenheim Bruening Logsdon Orkin & Hanson

[57] ABSTRACT

The invention relates to a stripping element (4) for placing on a system support or carrier (3) of a stripping device (1) for the discharge and of a conveyor belt (2), which has a stripping plate (8), which is in the ready-to-operate position engages in stripping manner on the conveyor belt (2), a plate support (9), to whose upper end is fixed the stripping plate (8), a torsion spring joint (7) on which the plate support (9) is guided in pivotable and spring-loaded manner about a horizontal axis, a base (6) on which is held the torsion spring joint (7) and which is placed on the system carrier (3), a vertical adjustment device (21, 26; 44, 51) for the vertical adjustment of the stripping plate (8) along a first axis (A1), a pivot bearing (17, 34) for pivoting the stripping plate (8) about a second axis (A2) for setting the parallelism of the stripping edge of the stripping plate (8) with respect to the conveyor belt (2). In order to achieve a compact, easily assemblable and disassemblable, as well as adjustable construction the first axis (A1) of the vertical adjustment device (21, 26; 44, 51) and the second axis (A2) of the pivot bearing (17, 34) are located on the same line. As a result the vertical adjustment device and the pivot bearing can be jointly arranged as a constructional unit in a tube socket (5, 35).

33 Claims, 9 Drawing Sheets

STRIPPER ELEMENT MOUNTED ON A SYSTEM OF A STRIPPING DEVICE

BACKGROUND OF THE INVENTION

The invention relates to a stripping element for placing on a system support or carrier of a stripping device for the discharge end of a conveyor belt, which has a stripping plate, which in the ready-to-operate position engages in stripping manner on the conveyor belt, a plate support, to whose upper end is fixed the stripping plate, a torsion spring joint on which the plate support is guided in pivotable and spring-loaded manner about a horizontal axis, a base on which is held the torsion spring joint and which is placed on the system carrier, a vertical adjustment device for the vertical adjustment of the stripping plate along a first axis, a pivot bearing for pivoting the stripping plate about a second axis for setting the parallelism of the stripping edge of the stripping plate with respect to the conveyor belt, the second axis forming an angle smaller than 90° with the conveyor belt portion running onto the stripping plate.

European patent 254 977 discloses a stripping device for the return area of conveyor belts, which comprises an adjustable, fixed or resiliently mounted system carrier or support extending transversely to the conveyor belt running direction and a plurality of stripping elements in each case held on bases. The stripping elements are fixed in juxtaposed manner to the system carrier and in each case carry a stripping plate or disk set in stripping manner with respect to the conveyor belt movement direction. The stripping plates are mounted in pivoted manner by a torsion spring about an axis at right angles to the conveyor belt running direction and resiliently for an elastic deflection movement about said axis. A deflection movement is e.g. performed if obstacles adhering firmly to the conveyor belt strike the stripping plate. For the setting and engagement of the stripping plate on the associated belt area, each stripping element has a vertical adjustment device and for the preferably automatic setting of the parallelism of the stripping plate with respect to the conveyor belt has a pivot bearing for pivoting about an axis, which forms an angle smaller than 90° with the conveyor belt portion running onto the stripping plate.

These known stripping elements have a high stripping capacity, because they also react rapidly to minor displacements of the conveyor belt underface or are easily adjustable and can automatically assume an optimum position for the stripping of impurities adhering to the conveyor belt.

SUMMARY OF THE INVENTION

The problem of the invention is to so further develop a stripping element of the aforementioned type that, in conjunction with easy assembly and disassembly of the stripping element and/or the plate support, a compact unit with a particularly simple vertical adjustment device is provided.

In the case of a stripping element of the aforementioned type this problem is solved in that the firs axis associated with the vertical adjustment device and the second axis associated with the pivot bearing are located on the same line. This leads to a compact unit, permitting in simple and space-saving manner both a vertical adjustment and an automatic pivoting of the stripping plate. The pivot bearing and vertical adjustment device can be constructionally combined. In addition, this unit is easy to assemble and fit and can therefore be easily replaced in the case of a defect, which leads to high maintenance friendliness.

According to a further embodiment of the invention the pivot bearing comprises a bearing bush connected to the system carrier and placed in non-rotary manner in a tube socket and a journal connected to the plate support and the stripping plate and pivotably mounted in the bush. This not only permits rational manufacture, but also a good transfer of the forces acting in operation with a space-saving construction.

It is particularly appropriate if the vertical adjustment device is constructed for the adjustment of the height of the journal with respect to the bearing bush and preferably a locking screw on the side remote from the plate support can be screwed into the bearing bush for the axial longitudinal fixing of the said bush in the tube socket. The fixing of the stripping element or its plate support in the tube socket is brought about by a single locking screw which, in the fitted, operational position, can be located within the tube socket, is accessible from the lower side and can in particular be operated with a single wrench. Therefore the fitting and removal of the stripping element is particularly simple.

Fundamentally the height or vertical adjustment takes place via the system carrier position. The aforementioned vertical adjustment device is provided for the individual setting of the stripping elements. This vertical adjustment device, according to an embodiment of the invention, also incorporates a setscrew accessible through or in the locking screw and whose fixing takes place by frictional engagement outside the adjustment. Thus, the vertical adjustment can once again take place with a single tool by simply turning the setscrew in one or other direction. The setscrew is positioned in a protected manner on the underside of the tube socket, so that it cannot be damaged by the stripping off material, or by rain and the like. Optionally, it is possible to fit a protective cap.

It is particularly advantageous to make the bearing bush from plastic, whilst ensuring that the tube socket receiving the base and journal are made from steel. This prevents a direct contact of the steel parts moved relative to one another, so that rusting cannot occur. In the case of a skillful choice of the plastic material, this leads to a good sliding property, so that independently of lubricants, a good pivotability of the journal within the bush is ensured. This pivotability of the stripping element about the second axis coinciding with the centre axis of the tube socket is important for the automatic parallel setting of the edge of the stripping plate with respect to the conveyor belt surface. The prerequisite for this is that the pivot axis is at an angle smaller than 90° to the conveyor belt plane.

A compact construction of the stripping element and a flat arrangement, which leads to further advantages, is achieved in that the base of the stripping element when fitted in the stripping device extends substantially parallel to the conveyor belt running direction and the torsion spring joint is fixed by one spring and to the free end of the base and to the other spring end is fitted the pivot bearing with the plate support.

It is also appropriate if the pivot bearing in the installed position is laterally displaced with respect to the centre axis of the base on the torsion spring joint, which leads to a more compact construction.

According to a further embodiment of the invention the base is secured in the mounting support by a fixing means, e.g. a screw, extending in the axial direction thereof. This construction permits a rapid, simple replacement of the stripping elements.

Alternatively to the construction of the mounting support of the plate support and/or the stripping element with a permanently automatically freely adjustably stripping edge of the stripping plate, the plate support is fixable in predetermined pivot positions in the pivot bearing. Thus, once a pivot position has been set, it can be easily fixed by a locking means.

The pivot bearing preferably has a tube socket forming the bearing casing, a metallic intermediate bush displaceable and adjustable along the first axis, as well as a bearing bush, which forms the pivot bearing surface and which is preferably made from plastic, in which the journal carrying the plate support is rotatably mounted. By means of a screw in the tube socket, which enters a groove in the intermediate bush, it is easy to adjust the height of the journal. Apart from an easy vertical adjustability, this arrangement ensures a free rotary mounting of the journal and the plate support without any need for maintenance whilst at the same time leading to a long service life, whilst, if necessary, the plate support with the journal, bearing bushes and intermediate bush can be removed as a whole from the outer sleeve of the pivot bearing.

Thus, the stripping element according to the invention is an easily handlable unit, which can be packed, handled and replaced in simple manner. In particular the fitting and removal on the system support of the stripping device and the vertical adjustment can be brought about with particular simplicity. Reference should be made to the subclaims and details concerning preferred constructions.

BRIEF DESCRIPTION OF THE DRAWINGS

Further advantages and features of the invention can be gathered from the following description of several embodiments with reference to the attached drawings, wherein show.

DESCRIPTION OF THE PREFERRED EMBODIMENTS

The embodiments of a stripping device 1 according to the invention shown in the drawings are used for the stripping of conveyor belts 2 drawn in a direction G. Therefore the stripping device 1 is placed below the conveyor belt 2. The stripping device 1 is provided with a system carrier 3 extending at right angles to the conveyor belt 2 and on which are provided in juxtaposed manner several stripping elements 4 displaced in the direction of the conveyor belt 2. For receiving the stripping elements 4 the system carrier 3 of the stripping device 1 has several tube sockets 5 or mounting supports 33.

The stripping element 4 fundamentally comprises a base 6, a torsion spring joint 7 directly or indirectly connected to the base 6 and a plate support 9 carrying at its upper end a stripping plate 8 and which is connected to the torsion spring joint 7.

The stripping plates 8 clean the conveyor belt surface in that they engage in stripping or scraping manner thereon. They adapt to the unevennesses of the conveyor belt 2, so that there is no running onto a corner of a stripping plate 8. The compensating movement takes place by pivoting the plate support 9 or the stripping element 4 in a pivot bearing about an axis A. Thus, the pivot bearing ensures the automatic setting of the parallelism of the stripping edge of the stripping plate 8 with respect to the involved area of the conveyor belt surface. The stripping plate 8 is vertically adjustable along the axis A through a vertical adjustment device. The axis A forms with the portion of the conveyor belt 2 running onto the stripping plate 8 an angle which is smaller than 90°.

FIGS. 1 to 4 show a first embodiment of the stripping element 4 in the stripping device 1. The stripping elements 4 are juxtaposed at right angles to the running direction of the conveyor belt 2 and displaced in the running direction of the latter in such a way that there are overlapping cleaning areas of the stripping plates 8.

Figure 1:
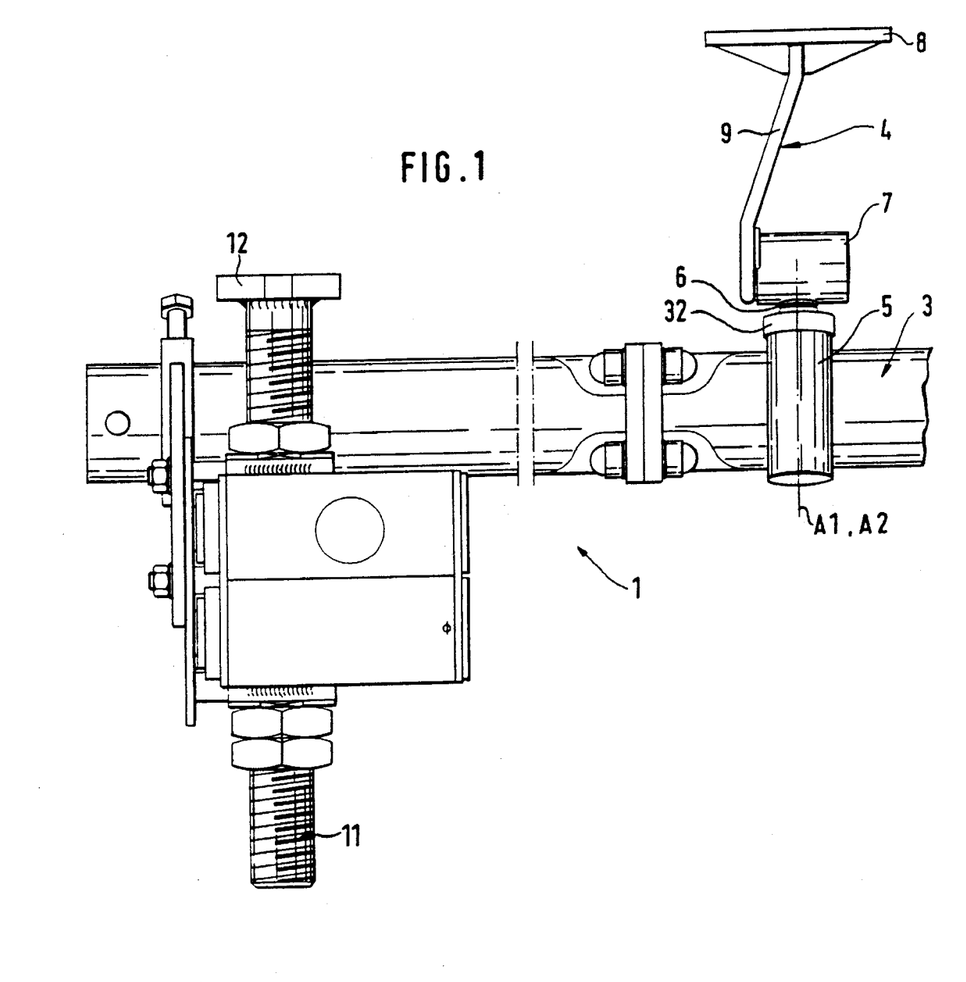
FIG. 1 A front view of part of a stripping device with a stripping element in the fitted state according to a first embodiment of the invention.
Figure 2:
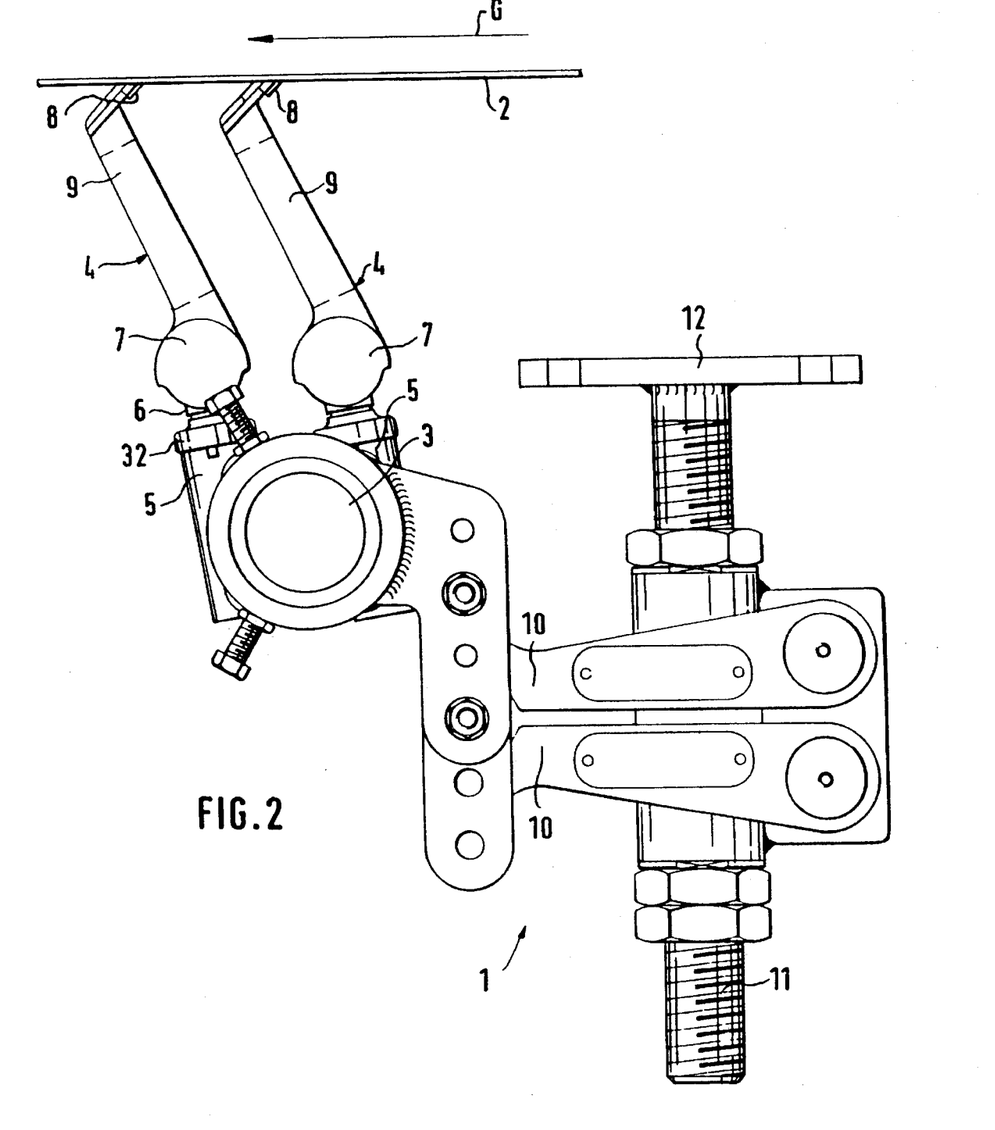
FIG. 2 A side view of the stripping device of FIG. 1.

Each stripping element 4 is held on the system carrier 3 tube by a tube socket 5 in which it is inserted with its cylindrical base 6. The tube socket 5 is a fixed part of the tubular system carrier 3 running at right angles to the movement direction of the conveyor belt 2. The system carrier 3, to which are welded several tube sockets 5, extends over the entire width of the conveyor belt 2 and is fitted by means of spring-loaded rocker arms 10 on both sides of the belt 2 to in each case one spindle 11, which by means of a plate 12 shown in FIGS. 1 and 2 is fixed to a not shown frame or support structure of the belt 2. The system carrier 3 is preferably constructed in mirror symmetrical manner. To facilitate the understanding of FIGS. 1 to 4 only part of the stripping device 1 is shown.

Each tube socket 5 carries a stripping element 4 which, as stated hereinbefore, essentially comprises the base 6, the torsion spring joint 7 and the plate support 9 with the stripping plate 8. Whilst the plate support 9 is connected to an inner square end 13 of the torsion spring joint 7, the base 6 is connected to the casing 14 of the torsion spring joint 7, cf. FIG. 3. In known manner the torsion spring joint 7 contains rubber elements 15, so that the square end 13 is centred and spring-loaded. The expert is well aware of the function of such torsion spring joints, also for stripping elements, so that there is no need for a more detailed description here.

Figure 3:
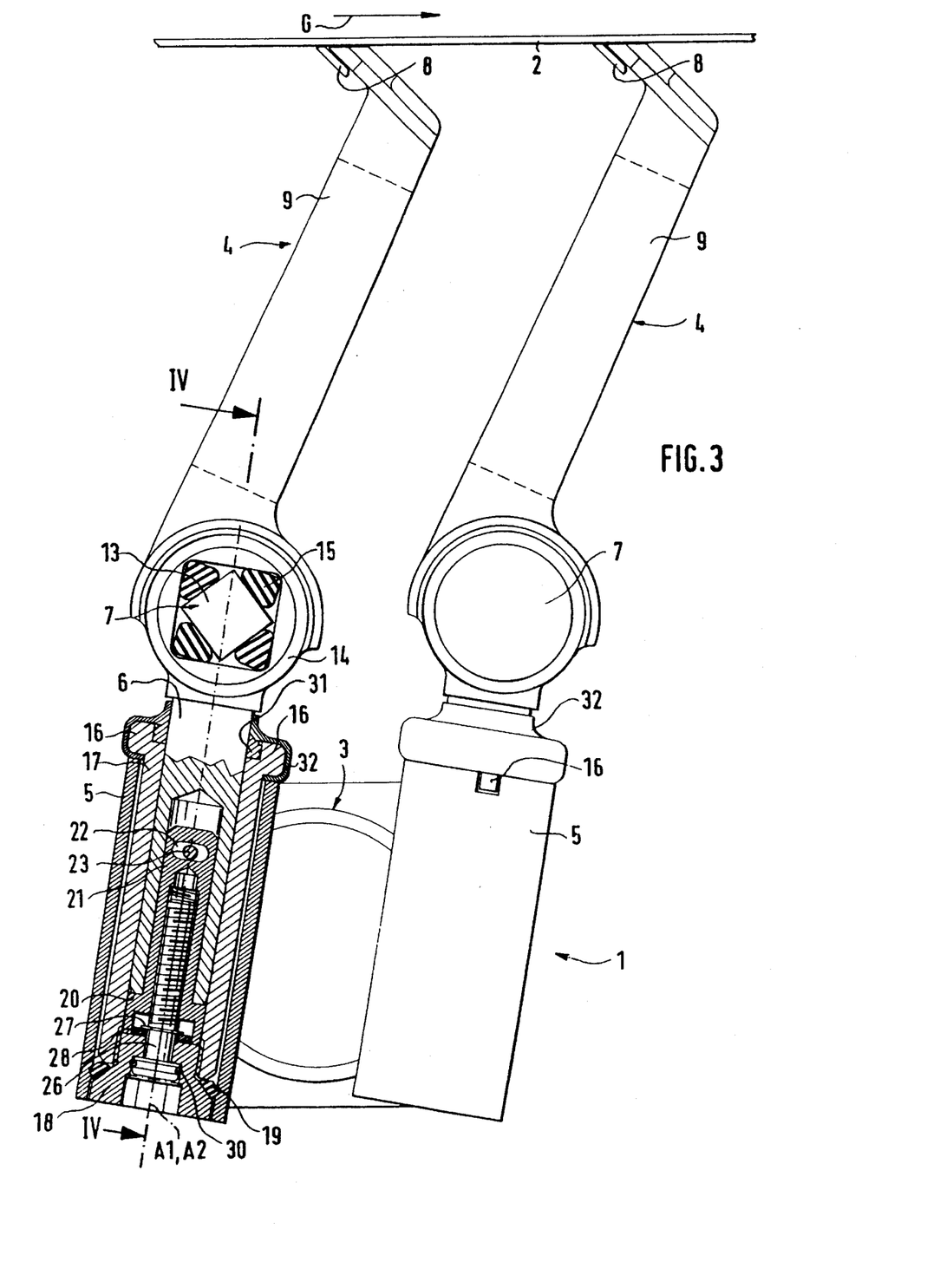
FIG. 3 A side view of a system carrier of the stripping device of FIGS. 1 and 2 with a sectionally represented stripping element and a further stripping element.
Figure 4:
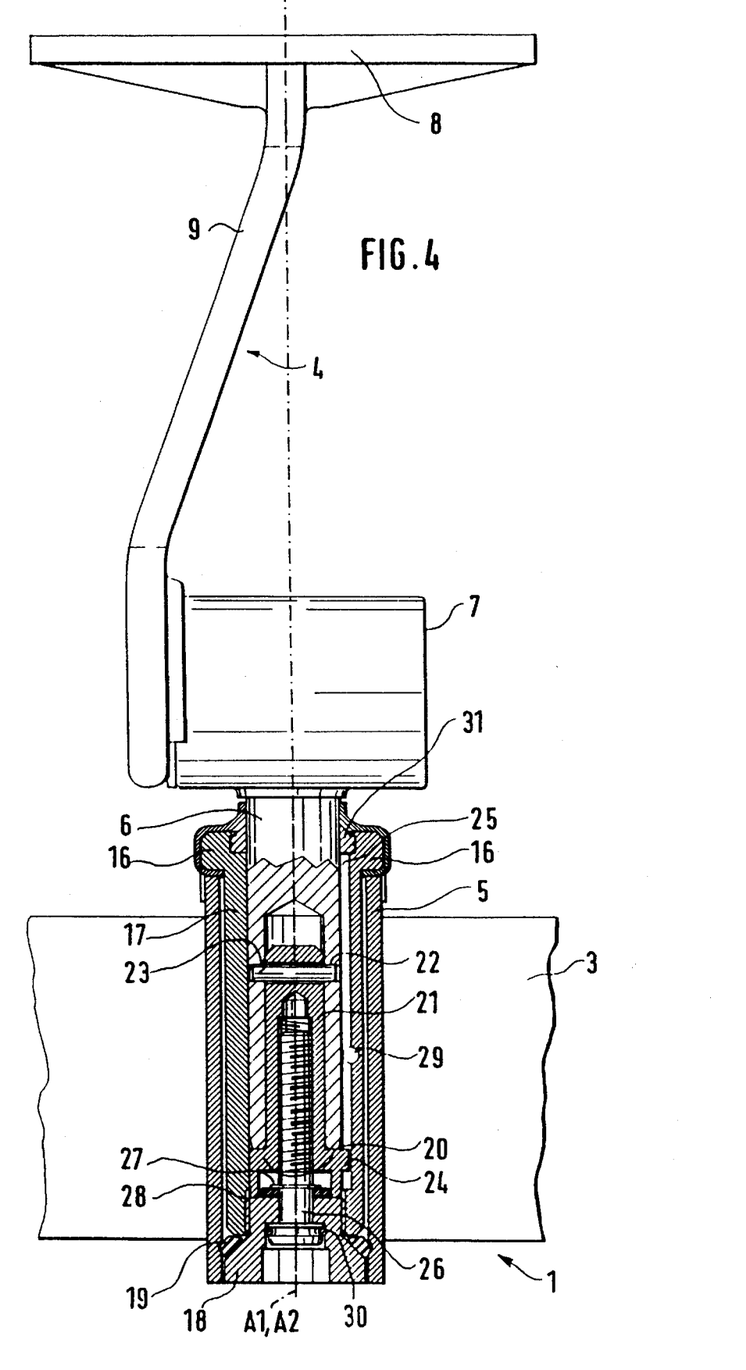
FIG. 4 A sectional view through the stripping element along line IV—IV of FIG. 3.

In order to more particularly ensure an automatic setting of the parallelism of the stripping edge of the stripping plate 8 with respect to the conveyor belt 2, the stripping 4 is pivotably mounted about an axis A in a pivot bearing. The pivot bearing is formed by the tube socket 5, a plastic bearing bush 17 located in the socket 5 and by the base 6 of the stripping element 4 mounted in rotary manner in the bush 17. At the upper end of the tube socket 5 there are two recesses, in which each case engages a projection 16 of the bush 17. The recesses and projections 16 are circumferentially arranged in such a way that only one arrangement of the bush 17 in the socket 5 is possible. The bush 17 extends approximately over the entire length of the socket 5 and has on its underside and internal thread into which is screwed a locking screw 18. The locking screw 18 is a socket-head screw with a cross-sectionally circular edge, whose diameter is somewhat smaller than the internal diameter of the tube socket 5. In the installed position the locking screw 18 presses a conical face against the lower end of the bearing bush 17 and an O-ring 19 is pressed outwards by the conical face against the wall of the socket 5 and into a groove provided thereof. This situation is shown in FIGS. 3 and 4. In this position the locking screw 18 is screwed into the tube socket 5 in clearance-free, rotation-prevented manner, namely by frictional engagement.

On releasing the locking screw 18 the O-ring returns to its untensioned starting position. With the locking screw 18 loosened the bearing bush 17 with the screw 18 can be drawn upwards out of the socket 5. Conversely this permits an easy insertion of the bush 17 into the socket 5. The represented groove is not necessary for a secure seating of the stripping element 4 in the tube socket 5 and therefore in the system carrier 3 and is only provided as an additional securing means. It is merely necessary to squeeze the O-ring 19 against the smooth wall of the tube socket 5 to ensure an adequate fixing.

The base 6, which is constructed as a journal, is inserted in the interior of the bearing bush 17 and firmly welded to the basing 14 of the torsion spring joint 7. In its basic position the base 6 engages on the collar 20 of an adjusting bush 21 and is pivotably connected in the pivoting direction and in clearance-free manner in the axial direction to said bush 21 with the aid of a pin connection. For this purpose the adjusting bush 21 has an elongated hole 22 through which passes a pin 23, which is secured in a corresponding transverse bore in the base 6. Thus, the unit formed from the base 6, the torsion spring joint 7, the plate support 9 and the stripping plate 8 can pivot backwards and forwards by adequate angular amounts, a rotary movement of the bush 21 being avoided in that a nose 24 (FIG. 4) shaped onto its collar 20 is guided in a longitudinal groove 25 of the bearing bush 17.

The adjusting bush 21 forms part of a device for the vertical adjustment of the base 6 with respect to the bearing bush 17 and therefore the stripping plate 8 along the axis A. The vertical adjustment device will now be described in greater detail. Within the locking screw 18 can be rotated a setscrew 26, but which is kept fixed in the axial direction and for this purpose are provided a screw head and a shaft securing ring 27 with a disk 28 below it and which is placed in a groove made in the setscrew 26. The setscrew 26, which is constructed as a socket head screw, can be turned backwards and forwards without hindrance from below. For this purpose it is fixed in the axial direction by the shaft securing ring 27 or the head, so that a rotary movement of the setscrew 26 leads to an axial movement of the adjusting bush 21. As stated, the latter cannot rotate with it, because the nose 24 prevents a rotary movement within the longitudinal groove 25. The adjusting path is limited by a pin 29, which is drive into the bearing bush 17 and blocks an upward path within the longitudinal groove 25. The setscrew 26 is secured by an O-ring 30 by frictional engagement so as to ensure that there is no automatic twisting.

If a stripping element 4 is to be disassembled from a tube socket 5, firstly the locking screw 18 is loosened in the bearing bush. The stripping element 4 can now be drawn upwards out of the tube socket 5. Assembly takes place in the reverse manner.

It is obvious that in the case of a pin connection between the base 6 and the adjusting bush 21, there can also be a reversal of the construction, i.e. the forming of an elongated hole in the base 6 and then the pin 23 is received in a transverse bore in the bush 21. Thus, this is the standard reversal of principle well known to the expert.

At the upper end of the bearing bush 17 is provided a pocket, into which is inserted a sleeve 31. In addition, the sleeve 31 and the upper part of the bearing bush 17 are enclosed by a sealing cap 32. In addition, all parts are coated with a water-resistance grease, so that there is a flexible movement and an optimum corrosion protection. On the locking screw 18 can be mounted a not shown protective cap, which is then removed for adjustment and release purposes. However, even without such a cap both screws 18 and 26 are well protected within the tube socket 5.

FIGS. 5 to 9 show a second, third and fourth embodiment of the stripping element 4, parts acting in the same way being given the same references as in the first embodiment. It is common to the second, third and fourth embodiments that the base 6 of the stripping element 4 is inserted in a mounting support 33, which is connected to the system carrier 3. The base 6 inserted in the support 33 runs parallel to the plane of the conveyor belt 2. The casing 14 of the torsion spring joint 7 is fixed directly to the outer end of the base 6. Between the torsion spring joint 7 and the plate support 9 is provided a pivot joint 34 in which is pivotably mounted said support 9. The square end 13 of the torsion spring joint 7 is welded to a tube socket 35 of the pivot bearing 34.

Figure 5:
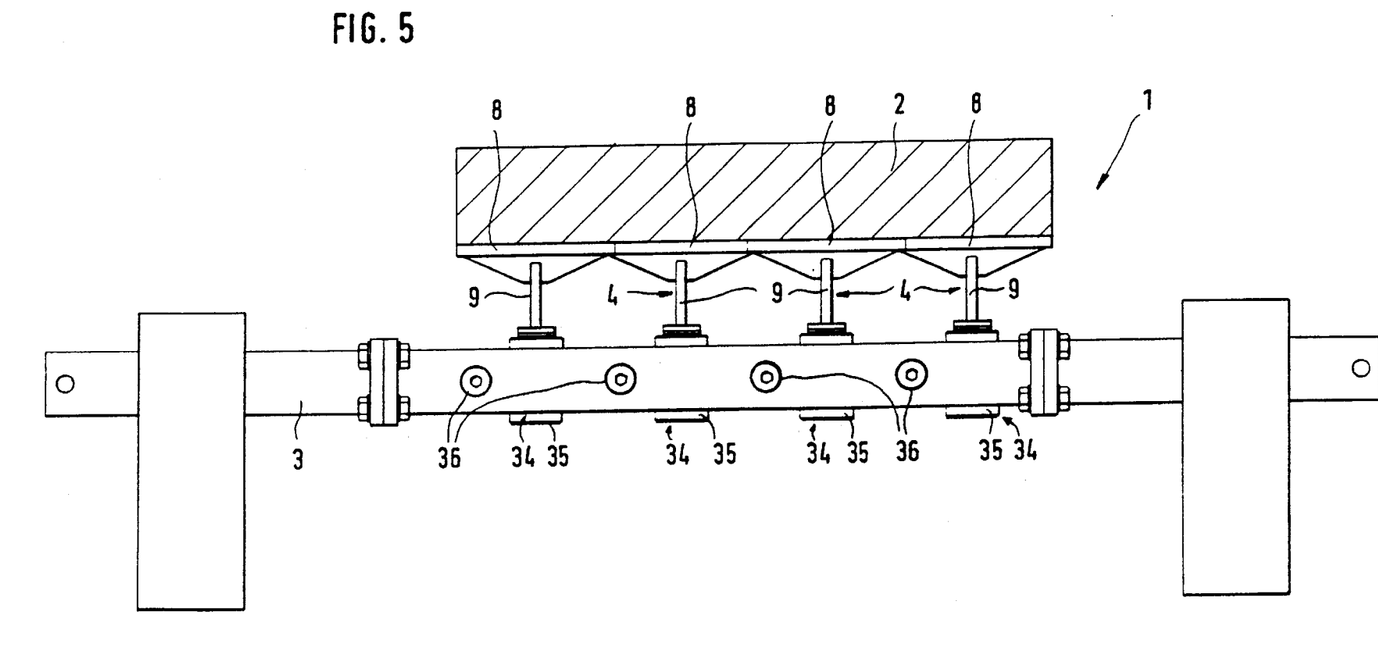
FIG. 5 A front view of a stripping device with four stripping elements according to a fourth embodiment of the invention.
Figure 6:
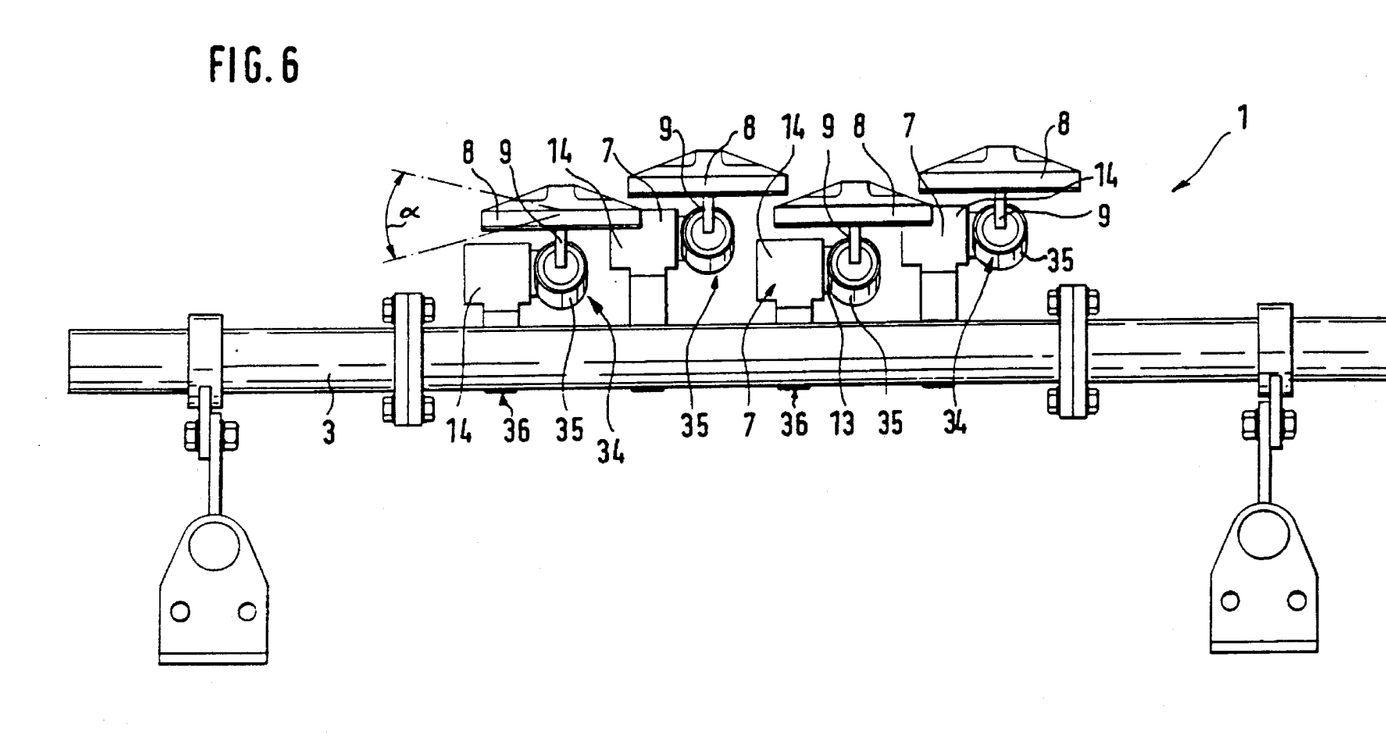
FIG. 6 A plan view of the stripping device of FIG. 5.
Figure 7:
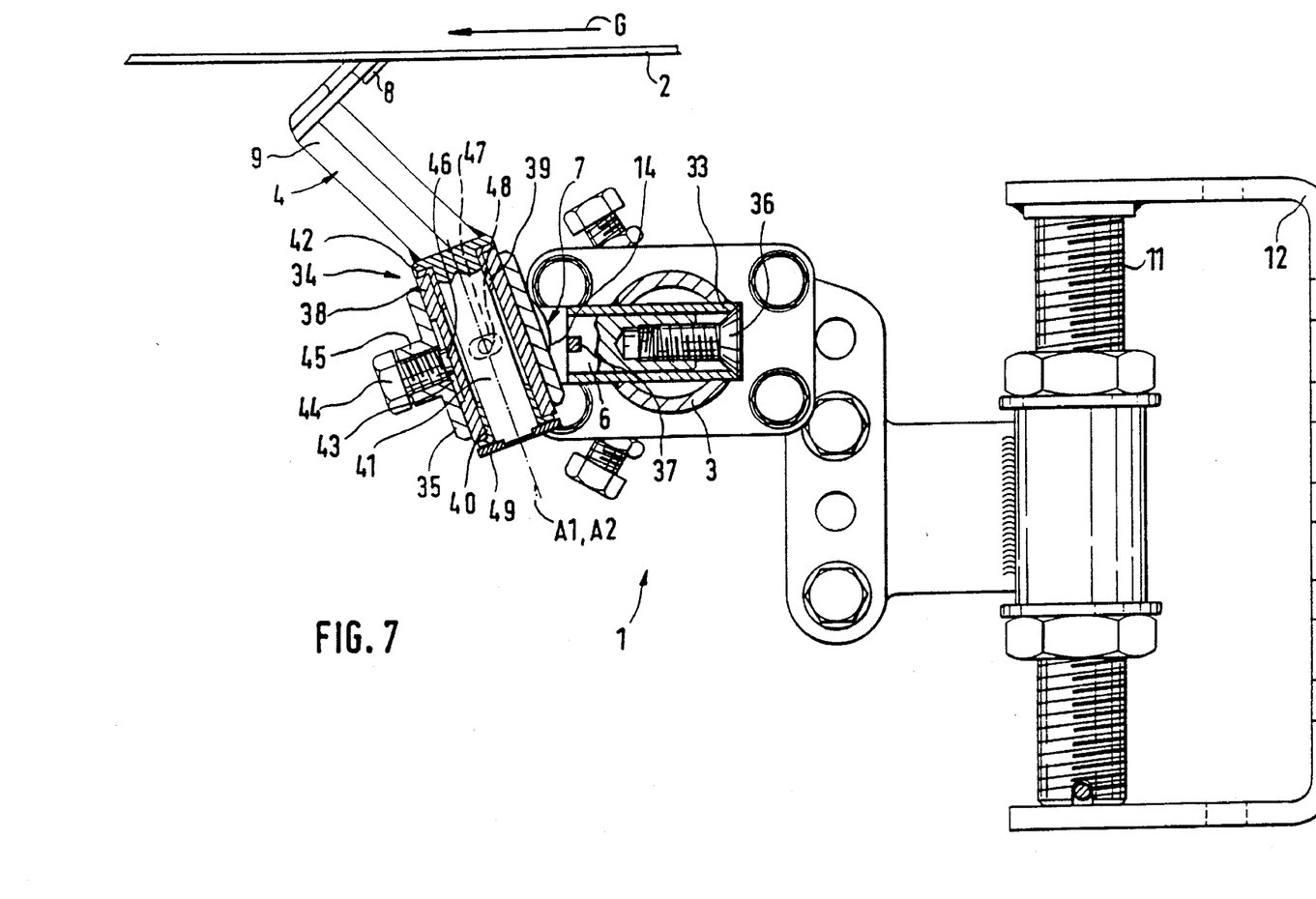
FIG. 7 A lateral sectional view through a tube socket and a base of one of the stripping elements and through the system carrier of the stripping device of FIGS. 5 and 6.

The pivot bearing 34 is laterally displaced with respect to the centre axis of the base 6 and the mounting support 33 on the torsion spring joint 7, being fixed to the square end 13 of said joint 7, as can be gathered from FIGS. 5 and 6 in conjunction with FIG. 7.

By means of a screw 36 extending axially of the mounting support 33, the base 6 is so fixed in the latter that the screw 36 engages with its threaded part in a thread made in the base 6 and its screw head engages on a circular ring face of the support 33. To prevent a rotary movement of the base 6 in the mounting support 33, the base 6 has a spring-loaded, radially-displaceable pin 37 running at right angles to the axial direction of the base 6, in a recess, which engages in a corresponding transverse bore in the support 33, if the base 6 is inserted for engagement in the support 33. This pin 37 with the associated transverse bore also serves as a positioning aid for inserting the base 6 in the mounting support 33.

In the embodiments of FIGS. 5 to 9 both the torsion spring joint 7 and the pivot bearing 34 and base 6 with support 33 are constructed in encapsulated manner, so as to prevent the penetration of wear-encouraging particles, e.g. coal dust or the like.

On disassembling the stripping element 4 from the system carrier 3, the screw 36 is loosened and the pin 37 is pressed inwards into the recess from the outside and then the stripping element 4 with the base 6 can be drawn out of the mounting support 33. The stripping element 4 can then be inserted in reverse order with the base 6 in the mounting support 33 and can again be fixed with the screw 36. However, it is also possible to draw the plate support 9 out of the pivot bearing 34, as is apparent from the description of the individual embodiments.

The pivot bearing 34 according to FIGS. 5 to 7 of the second embodiment of the stripping element 4 comprises the tube socket 35, an intermediate sleeve 38 and an upper and lower bearing bush 39, 40. The upper and lower bearing bush 39, 40 in each case have a flange edge which rests on the front face of the intermediate sleeve 38, so that each bush 39, 40 is fixed in an axial direction. The plate support 9 with its end region facing the stripping plate 8 is placed in the bearing bushes 39, 40 and said end region is constructed as a journal 41 with a stop 42. The stop 42 rests on the upper bearing bush 39, so that the plate support 9 is also axially mounted.

The tube socket 35 and the intermediate sleeve 38 are made from metal and the bearing bushes 39, 40 from plastic. On its outer face the intermediate sleeve 38 is provided with an axially directed groove 43, in which engages a screw 44 screwed into the socket 35 and has a limited length, as can be gathered from FIG. 7. A secure seating of the screw 44 is ensured in that the tube socket 35 has a connecting piece with a thread into which the screw 44 is screwed.

In order to move the plate support 9 pivotable about the axis A together with the stripping plates 8 axially along the axis 8 in the heightwise direction, it is necessary to loosen the screw 44 to such an extend that its end 46 is released from the bottom of the groove 43, so that subsequently the intermediately sleeve 38, the bearing bushes 39, 40 and the journal 41 can be moved along the axis A to the maximum corresponding to the extension of the groove 43. The screw 44 is then retightened, so that the intermediate sleeve 38 is again fixed relative to the tube socket 35.

In order to disassemble the complete unit comprising the plate support 9, the stripping plate 8, the journal 41, the bearing bushes 39, 40 and the intermediate sleeve 38, it is necessary to extract the screw 44 from the connecting piece 45 to such an extent that the end 46 of the screw 44 no longer engages in the groove 43 and the intermediate sleeve 38 with the parts located therein can be drawn out of the tube socket 35.

It can be gathered from FIG. 7 that the journal 41 has a radially extending elongated slot 47 in which engages a pin 48 connected to the intermediate sleeve 38. It keeps the intermediate sleeve 38 on the journal 41 in such a way that they are rotatable relative to one another and are only jointly axially movable when the screw 44 has been loosened in the above-described manner. Thus, the angle of twist of the plate support 9 in the pivot bearing 34 is limited to an angle α of 25°.

The lower face of the intermediate sleeve 38 is closed and encapsulated by means of a plug 49, whose diameter corresponds to the external diameter of the intermediate sleeve 38 or is smaller than the latter. Thus, the plug 49 left in its place can be drawn out with the intermediate sleeve 38 and with the parts located therein.

Figure 8:
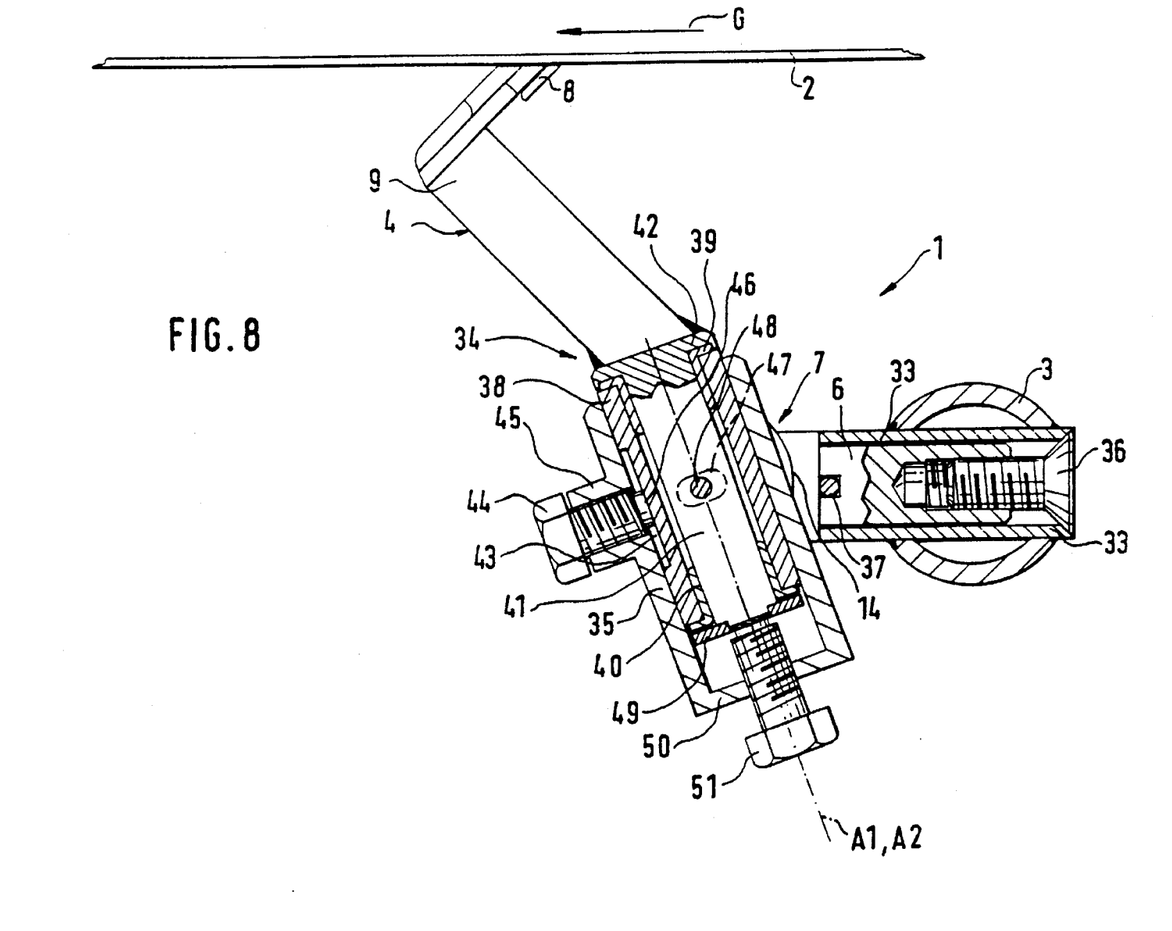
FIG. 8 A lateral sectional view through a tube socket and a base of a stripping element in a stripping device according to a third embodiment of the invention.

FIG. 8 shows a third embodiment of the stripping element 4. This essentially corresponds to the second embodiment according to FIGS. 5 and 7. Only the tube socket 35 is lengthened downwards and provided with an end wall 50. In the end wall 50 there is a threaded bore coaxial to the axis A and in which engages a setscrew 51. By means of the plug 49 the end of the setscrew 51 engages on the underside of the journal 41. Thus, unlike in the embodiment of FIG. 7, in the case of a vertical adjustment of the plate support 9 the journal 41 does not have to be held on loosening the screw 44, because as a result of the weight of the conveyor belt 2 engaging on the stripping plate the plate support 9 and therefore the journal 41 are pressed downwards. Now the journal 41, bearing bushes 39, 40, intermediate sleeve 38 and plug 49 are held by the setscrew 51. With the screw 44 loosened the complete unit can be moved continuously upwards and downwards by rotating the setscrew 51 and can then be fixed again by the screw 44.

Figure 9:
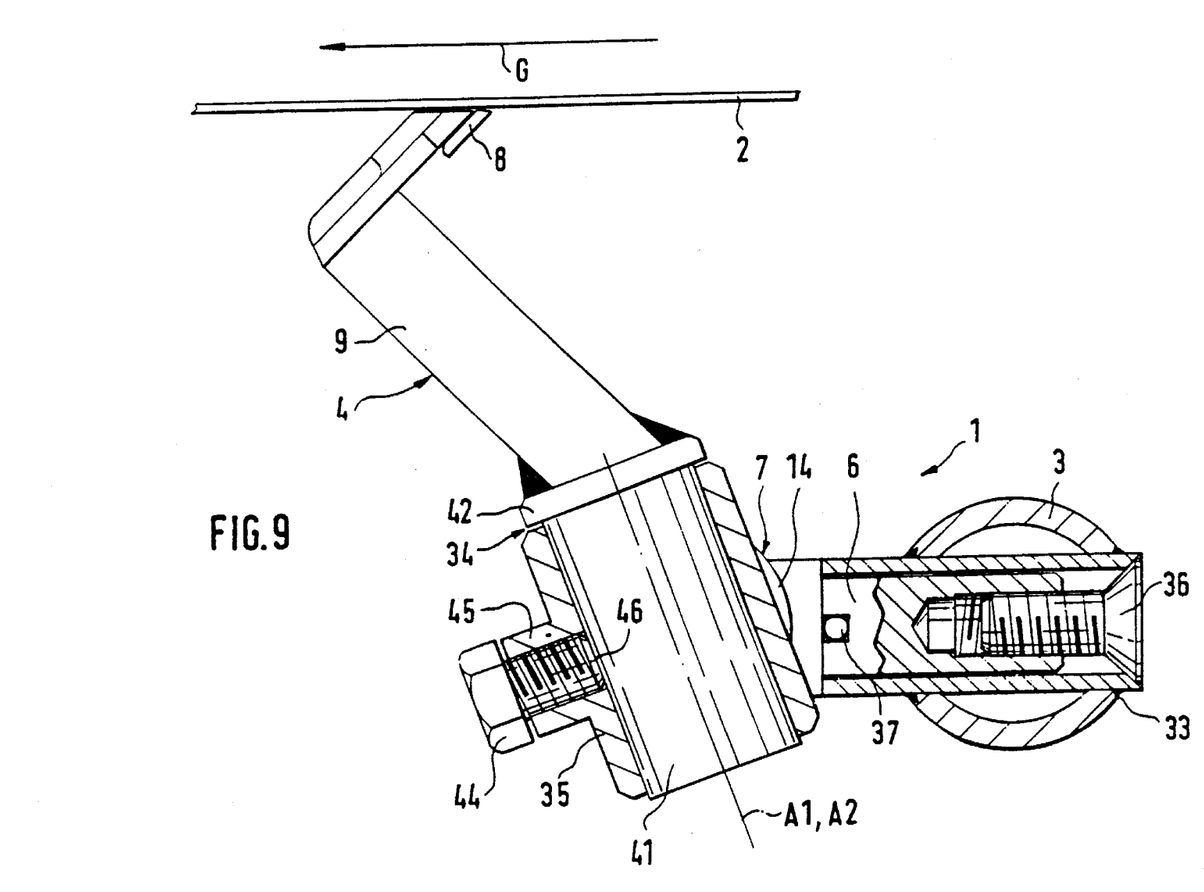
FIG. 9 A lateral sectional view through a tube socket and a base of a stripping element in a stripping device according to a fourth embodiment of the invention.

The fourth embodiment of the stripping element 4 shown in FIG. 9 differs from the second embodiment in that the support 9 with its journal 41 is directly rotatably mounted about the axis A in the tube socket 35 and the plate support 9 can be fixed in predetermined pivoting positions by inserting and tightening the screw 44 and the resulting clamping of the journal 41 in the tube socket 35. The vertical adjustment of the stripping plate 8 takes place through loosening the screw 44 and moving the journal 41 along the axis A. The screw 44 is then retightened and the journal 41 is fixed in the tube socket 35 by the screw 44. The force locked engagement of the end 46 of the screw 44 on the circumference of the journal 41 can be effectively reinforced both here and in the other embodiments by a corrugation or the like on the circumference of the journal 41.

What is claimed is:

1. A stripping element for placing on a system carrier of a stripping device for a discharge end of a conveyor belt comprising: a stripping plate which is in the ready-to-operate position engages in stripping manner on the conveyor belt, a plate support, to whose upper end is fixed the stripping plate, a torsion spring joint on which the plate support is guided in pivotable and spring-loaded manner about a horizontal axis, a base on which is held the torsion spring joint and which is placed on the system carrier, a vertical adjustment means for the vertical adjustment of the stripping plate along a first axis, and a pivot bearing for pivoting the stripping plate about a second axis for setting the parallelism of a stripping edge of the stripping plate with respect to the conveyor belt, wherein the second axis forms an angle smaller than 90° with a conveyor belt portion running onto the stripping plate, and wherein the first axis of the vertical adjustment means and the second axis of the pivot bearing are on the same line, wherein the pivot bearing includes a bearing bush connected to the system carrier and placed in non-rotary manner in a tube socket and the base being pivotably mounted in the bearing bush and connected to the plate support and the stripping plate.

2. A stripping element according to claim 1, wherein the vertical adjustment means is constructed for adjusting the height of the base with respect to the bearing bush.

3. A stripping element according to claim 1, wherein on a side remote from the plate support a locking screw can be screwed into the bearing bush for the axial longitudinal fixing of said bush in the tube socket.

4. A stripping element according to claim 1, wherein the bearing bush and the tube socket are interconnected by a non-rotary plug connection and the bearing bush has at least one projection and the tube socket has on its upper edge a recess associated with the projection.

5. A stripping element according to claim 3, wherein an edge of the locking screw has a diameter which is somewhat smaller than the internal diameter of the tube socket, such that the locking screw and the bearing bush form between them a conical squeezing surface occupied by an O-ring such that when the locking screw is tightened the O-ring is pressed against the inner wall of the tube socket.

6. A stripping element according to claim 5, wherein the inside of the tube socket is provided with a groove into which is introduced the O-ring when the locking screw is tightened.

7. A stripping element according to claim 3, wherein the vertical adjustment means encloses a setscrew accessible through the locking screw and whose fixing takes place outside the adjustment by frictional engagement.

8. A stripping element according to claim 7, wherein the setscrew engages an adjusting bush, which is placed in axially displaceable, but non-rotary manner in the bearing bush.

9. A stripping element according to claim 8, wherein the adjusting bush has a nose, the bearing bush has a longitudinal groove and wherein the nose engages in the longitudinal groove.

10. A stripping element according to claim 9, wherein the longitudinal groove has an adjustment limitation in the form of a pin, which is driven into the bearing bush transversely to the axial direction.

11. A stripping element according to claim 7, wherein the setscrew is rotatable, but is axially fixed in the locking screw.

12. A stripping element according to claim 7, wherein the setscrew and the locking screw is in each case a socket head screw with a circular edge.

13. A stripping element according to claim 1, wherein the stripping plate is mounted in freely rotatable manner limited to an angle about the second axis by the pivot bearing.

14. A stripping element according to claim 13, wherein the angle has a value between 15° and 3°.

15. A stripping element according to claim 13, wherein the adjustment means has an elongated hole and the base has at the same height a transverse bore and through the elongated hole and the transverse bore passes a pin, so that the base is pivotable by a limited amount with respect to the adjustment means, but is connected in substantially clearance-free manner therewith in the axial direction.

16. A stripping element according to claim 1, wherein the bearing bush is made from plastic.

17. A stripping element according to claim 1, wherein in its installed position in the stripping device, the base extends substantially parallel to a conveyor belt running direction and the torsion spring joint is fixed by one spring end to a free end of the base and at the other spring end is fitted the pivot bearing with the plate support.

18. A stripping element according to claim 17, wherein, considered from above, in the installed position the pivot bearing is laterally displaced with respect to a centre axis of the base on the torsion spring joint.

19. A stripping element according to claim 1, wherein the plate support is fixable in the pivot bearing in predetermined pivot positions with respect to the second axis.

20. A stripping element according to claim 1, further including an intermediate sleeve displaceable in the tube socket and provided between the latter and the bearing bush.

21. A stripping element according to claim 20, wherein the tube socket and the intermediate sleeve are made from metal.

22. A stripping element according to claim 20, further including a screw radially screwable from an outside to an inside in a threaded bore in a wall of the tube socket and whose inner end, for the positioning of the intermediate sleeve relative to the socket, engages in a groove running axially and externally on the sleeve and presses on the bottom of the groove for fixing the intermediate sleeve in the tube socket.

23. A stripping element according to claim 22, wherein the length of the groove is designed for a predetermined axial displacement of the intermediate sleeve in the tube socket.

24. A stripping element according to claim 1, wherein the vertical adjustment means and the pivot bearing are placed in the form of a constructional unit in the tube socket.

25. A stripping element according to claim 1, wherein the vertical adjustment means is constructed for adjusting the height of the journal with respect to the bearing bush.

26. A stripping element comprising a base which can be inserted in a mounting support on a system carrier of a stripping device wherein the base is secured in the mounting support by a fixing means and the base has a component cooperating with a locking means of the mounting support to prevent a rotary movement of the base relative to the mounting support wherein the base has a spring-loaded, transversely directed, radially displaceable pin in a recess, which is associated with a bore as part of the locking means in the mounting support and engages therein in the installed position.

27. A stripping element for placing on a system carrier of a stripping device for a discharge end of a conveyor belt comprising: a stripping plate, which in the ready-to-operate position engages in stripping manner on the conveyor belt, a plate support, to whose upper end is fixed the stripping plate, a torsion spring joint on which the plate support is guided in pivotable and spring-loaded manner about a horizontal axis, a base on which is held the torsion spring joint and which is placed on the system carrier, a vertical adjustment means for the vertical adjustment of the stripping plate along a first axis, and a pivot bearing for pivoting the stripping plate about a second axis for setting the parallelism of a stripping edge of the stripping plate with respect to the conveyor belt, wherein the second axis forms an angle smaller than 90° with a conveyor belt portion running onto the stripping plate, and wherein the first axis of the vertical adjustment means and the second axis of the pivot bearing are on the same line, wherein the pivot bearing includes a bearing bush connected to the system carrier and placed in non-rotary manner in a tube socket and a journal pivotably mounted in the bearing bush and connected to the plate support and the stripping plate.

28. A stripping element according to claim 27, wherein on a side remote from the plate support a locking screw can be screwed into the bearing bush for the axial longitudinal fixing of said bush in the tube socket.

29. A stripping element according to claim 27, further including an intermediate sleeve displaceable in the tube socket and provided between the latter and the bearing bush.

30. A stripping element according to claim 29, wherein the intermediate sleeve, the bearing bush and the journal are encapsulated by a plug at the lower end of the intermediate sleeve, the diameter of the plug corresponding at a maximum to the external diameter of the intermediate sleeve.

31. A stripping element according to claim 30, wherein the vertical adjustment means is formed by a setscrew engaging in a threaded bore in the tube socket and through which at least the journal is movable along the first axis.

32. A stripping element according to claim 31, wherein the setscrew engages on the plug and the intermediate sleeve with the bearing bush and the journal is axially displaceable through the setscrew.

33. A stripping element according to claim 29, wherein the journal has a radially directed elongated hole through which extends a pin connected to the intermediate sleeve.

* * * * *

UNITED STATES PATENT AND TRADEMARK OFFICE
CERTIFICATE OF CORRECTION

PATENT NO. : 5,518,107
DATED : May 21, 1996
INVENTOR(S) : Hans-Otto Schwarze

It is certified that error appears in the above-indentified patent and that said Letters Patent is hereby corrected as shown below:

Title page, item [57],
Line 3 "and" should read --end--.
Title page, item [57],
Line 4 "which is in" should read --which in--.

Column 1 Line 22 "patent" should read --Patent--.

Column 1 Line 58 "firs" should read --first--.

Column 2 Line 29 "other" should read --another--.

Column 3 Line 1 "adjustably" should read --adjustable--.

Column 3 Line 26 "and" should read --for--.

Column 4 Lines 33-34 "3 tube by" should read --3 by--.

Column 4 Line 61 after "stripping" insert --element--.

Column 5 Line 5 "and internal" should read --an internal--.

Column 5 Line 13 "thereof." should read --there.--.

Column 5 Line 30 "basing" should read --casing--.

Column 5 Line 61 "drive" should read --driven--.

Column 6 Line 13 "water-resistance" should read --water-resistant--.

UNITED STATES PATENT AND TRADEMARK OFFICE
CERTIFICATE OF CORRECTION

PATENT NO. : 5,518,107
DATED : May 21, 1996
INVENTOR(S) : Hans-Otto Schwarze

It is certified that error appears in the above-indentified patent and that said Letters Patent is hereby corrected as shown below:

Column 6 Line 44 "radially-displaceable" should read --radially displaceable--.

Column 7 Line 17 after "piece" insert --45--.

Column 7 Line 20 "plates" should read --plate--.

Column 7 Line 21 "axis 8" should read --axis A--.

Column 7 Line 22 "extend" should read --extent--.

Column 7 Line 24 "intermediately" should read --intermediate--.

Column 8 Line 2 "upwards and" should read --upwards or--.

Claim 1 Line 21 Column 8 "plate which is in" should read --plate, which in--.

Claim 14 Line 23 Column 9 "3°." should read --30°.--.

Signed and Sealed this

Twenty-sixth Day of November 1996

Attest:

BRUCE LEHMAN

*Attesting Officer*     *Commissioner of Patents and Trademarks*